United States Patent

White

[15] 3,655,067

[45] Apr. 11, 1972

[54] BAR FEEDER AND ESCAPEMENT DEVICE

[72] Inventor: Frank F. White, Shaker Heights, Ohio

[73] Assignee: Automation Development Corporation, Lake County, Ohio

[22] Filed: Apr. 20, 1970

[21] Appl. No.: 29,863

[52] U.S. Cl. .........................................................214/1 PB
[51] Int. Cl. ...................................................B65h 51/26
[58] Field of Search............................214/1 P, 1 PB, 339, 1 R

[56] References Cited

UNITED STATES PATENTS

| | | | |
|---|---|---|---|
| 2,751,781 | 6/1956 | McConnell | 214/1 PZ X |
| 3,456,823 | 7/1969 | Martelee | 214/1 Q X |
| 2,763,236 | 9/1956 | Cummings | 214/1 PZ X |
| 3,072,980 | 1/1963 | Ewing | 214/1 PZ X |
| 1,700,697 | 1/1929 | Draper | 214/1 PZ X |
| 3,306,472 | 2/1967 | Blanz | 214/1 PZ |
| 3,493,125 | 2/1970 | White et al. | 214/1 PZ X |
| 3,521,766 | 7/1970 | Soteropulos et al. | 198/128 X |

Primary Examiner—Gerald M. Forlenza
Assistant Examiner—Frank E. Werner
Attorney—McCoy, Greene and Howell

[57] ABSTRACT

An automatic bar feeder for a centerless grinder having conventional adjustable bar-supporting rollers (68) carried by a long vertically adjustable horizontal guide tube (28), a feed ramp (14), an escapement shaft (17), a plurality of long narrow load arms (30) on said shaft having long adjusting slots (32) for mounting adjustable bar-engaging stops (31), adjustable escapement plates (18) on said shaft to lift one bar only from the ramp to the load arms, a high-speed pneumatic cylinder (69) for turning the escapement shaft rapidly to cause the escapement plates to throw the lowermost bar (W) on the ramp outwardly at a high speed such that it clears the nearest roller (68) and engages the stops (31) before the arms are lowered below said rollers (68), hydraulic cylinder means (165) for retarding and controlling the speed of lowering of the arms near the end of the stroke of said cylinder, a skewed motor-driven drive wheel (92) for engaging the bar to feed it into the grinder (B), and means (94) for swinging the drive wheel vertically.

18 Claims, 11 Drawing Figures

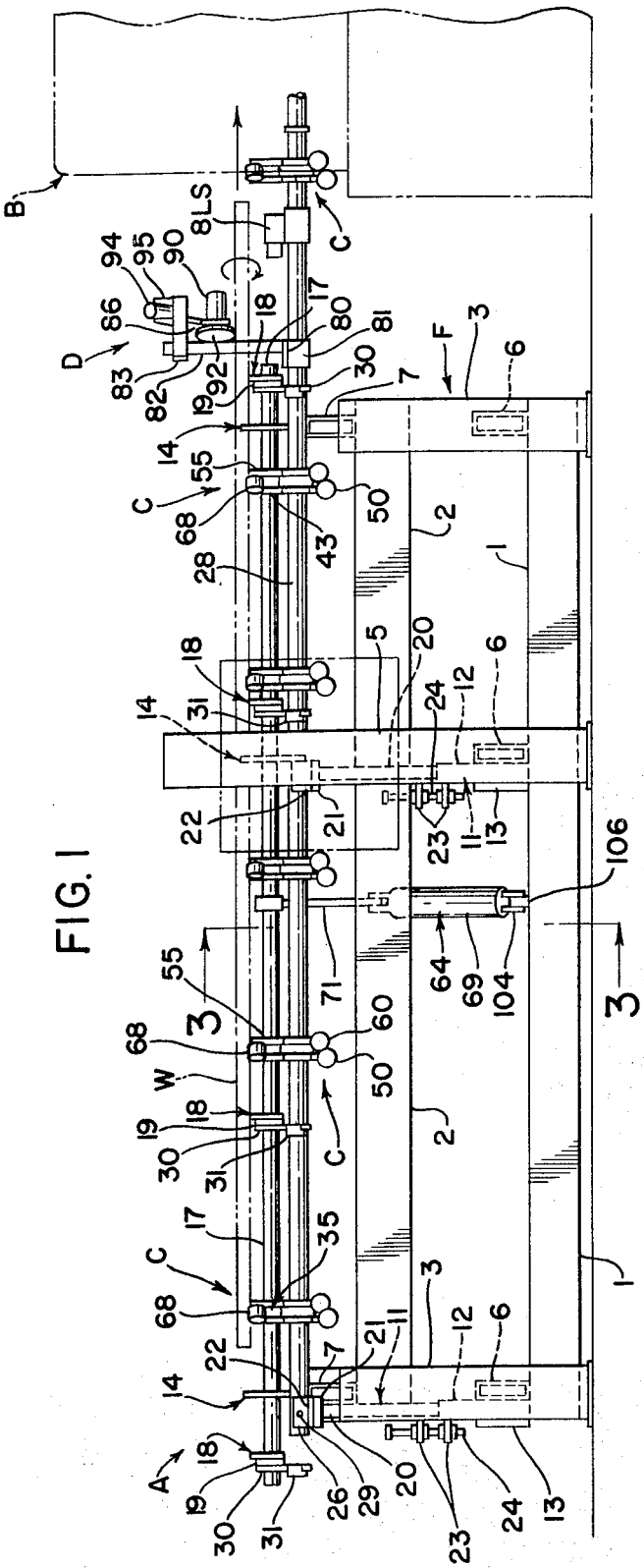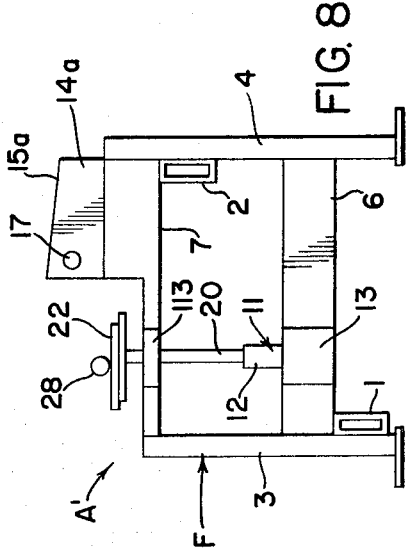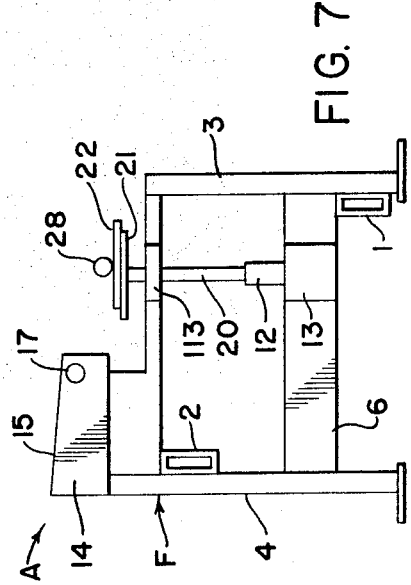

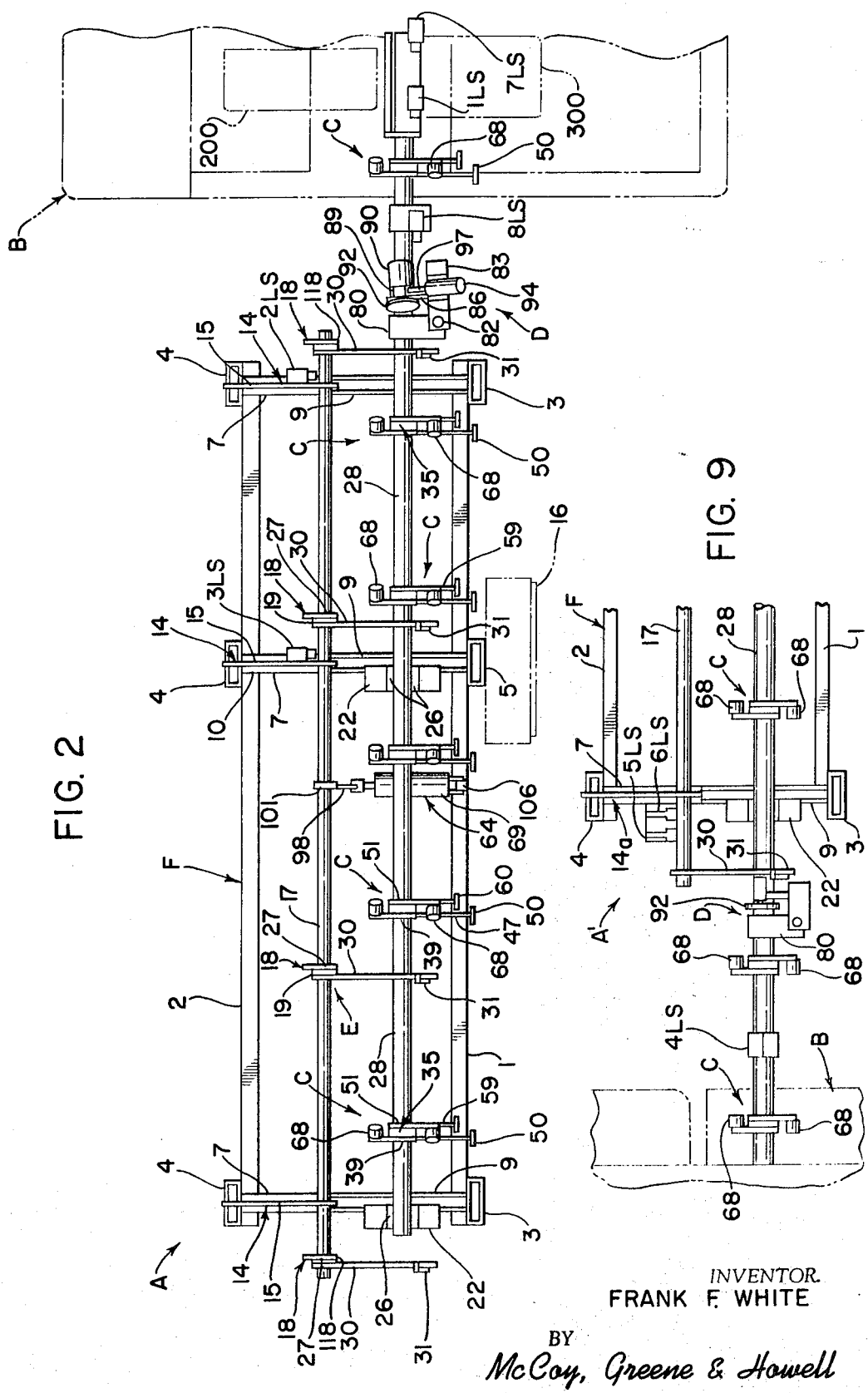

INVENTOR.
FRANK F. WHITE

BY
McCoy, Greene & Howell
ATTORNEYS

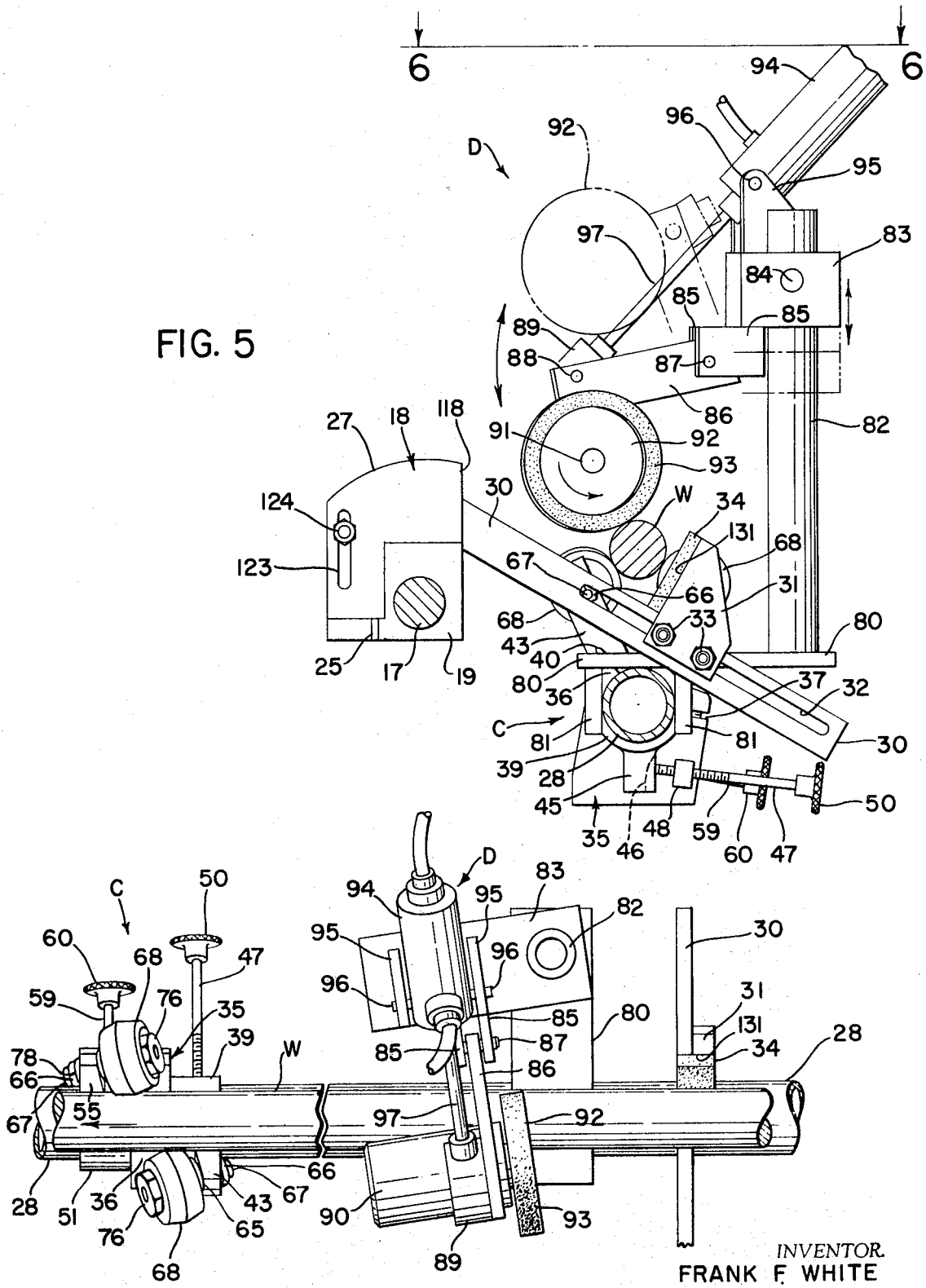

BAR FEEDER AND ESCAPEMENT DEVICE

DESCRIPTION OF THE INVENTION

The present invention relates to automatic bar feeders and more particularly to a bar feeder having unique bar-loading means which throw bars rapidly one at a time from the feed ramp to the bar-supporting rollers or carriers in an unusual manner such that the bars are gently lowered onto the carriers to avoid damage to the machined outer surfaces of the bars.

For many years prior to the present invention it has been customary to employ long adjustable fixtures of the type disclosed in U.S. Pat. Nos. 2,775,077; 3,019,571 and 3,091,900 to support bars or tubes as they are fed to a centerless grinder. These were loaded manually to avoid damage to the outer surfaces of the bars which were often machined to close tolerances.

Long prior to this invention, there has been a serious problem when transferring relatively heavy bars or tubes from the feed ramp to the conveyor or work-supporting carriers of a bar feeder because of the impact of the bar when it is lowered onto the work-supporting carriers. Such impact tends to damage both the bar and the carriers and often makes it necessary to employ relatively expensive equipment having heavy carriers, heavy supporting means therefor, and elastic rubber covering layers to cushion the impact. This problem is discussed in U.S. Pat. No. 3,493,125. The problem is particularly serious when designing a feeder to handle many different sizes of bar.

The present invention provides an effective and economical solution to this problem and makes it possible to provide reliable high speed automatic feeding of machined bars and tubes without damaging them. The problem is solved by employing relatively long load arms with stops adjustably mounted thereon and escapement means which throw the lowermost bar upwardly and outwardly from the feed ramp at a speed high enough to cause it to clear the work-supporting rollers and to engage the stops before the load arms are lowered below the rollers. Means, such as a hydraulic cylinder, are provided to retard and control the speed of lowering of the arms before the bar engages the rollers. The peculiar combination of forces applied to the bar during its movement from the feed ramp results in a gentle lowering of the bar without damaging impact with the rollers. Also the fast upward movement imparted to the bar causes it to move over the work-supporting rollers before the upper surfaces of the load arms move below the upper surfaces of said rollers.

The bar feeder of the present invention also has a unique means for feeding bars axially to a machine such as a centerless grinder, which does not interfere with movement of the bar from the feed ramp to the work-supporting rollers. A motor-driven drive wheel is provided which swings vertically into and out of engagement with the bar and which has an axis inclined a few degrees relative to the bar axis. The drive wheel thus causes axial as well as rotational movement of the bar and permits a fully automated feed system.

An object of the present invention is to provide a simple inexpensive automatic bar feeder which can handle accurately machined bars and tubes without damaging the machined surfaces thereof.

A further object of the invention is to provide an automatic bar feeder for a centerless grinder which can be adjusted to handle bars and tubes of a wide range of sizes and which functions effectively to avoid damage thereto.

Another object of the invention is to minimize the impact caused by lowering of a bar onto the work-supporting carriers of a bar feeder so that the size and cost of such carriers may be minimized.

A still further object of the invention is to provide a bar feeder which operates at relatively high speed.

These and other objects, uses and advantages of the present invention will become apparent to those skilled in the art from the following description and claims and from the drawings, in which:

FIG. 1 is a side elevational view of a bar feeder constructed according to this invention on a reduced scale with parts omitted, the control panel box and centerless grinder being shown in broken lines;

FIG. 2 is a top plan view of the bar feeder of FIG. 1 on the same scale;

FIG. 5 is a fragmentary transverse vertical sectional view showing the positions of the parts during feeding of a bar to the centerless grinder, the retracted position of the prerotation drive wheel being shown in broken lines;

FIG. 6 is a fragmentary foreshortened top view looking in the direction of the arrows 6—6 of FIG. 5;

FIG. 7 is an end view of the bar feeder on a reduced scale with parts omitted;

FIG. 8 is an end view similar to FIG. 7 showing a bar unloader located on the discharge side of the centerless grinder;

FIG. 9 is a fragmentary top plan view of the bar unloader of FIG. 8;

Figure 3:
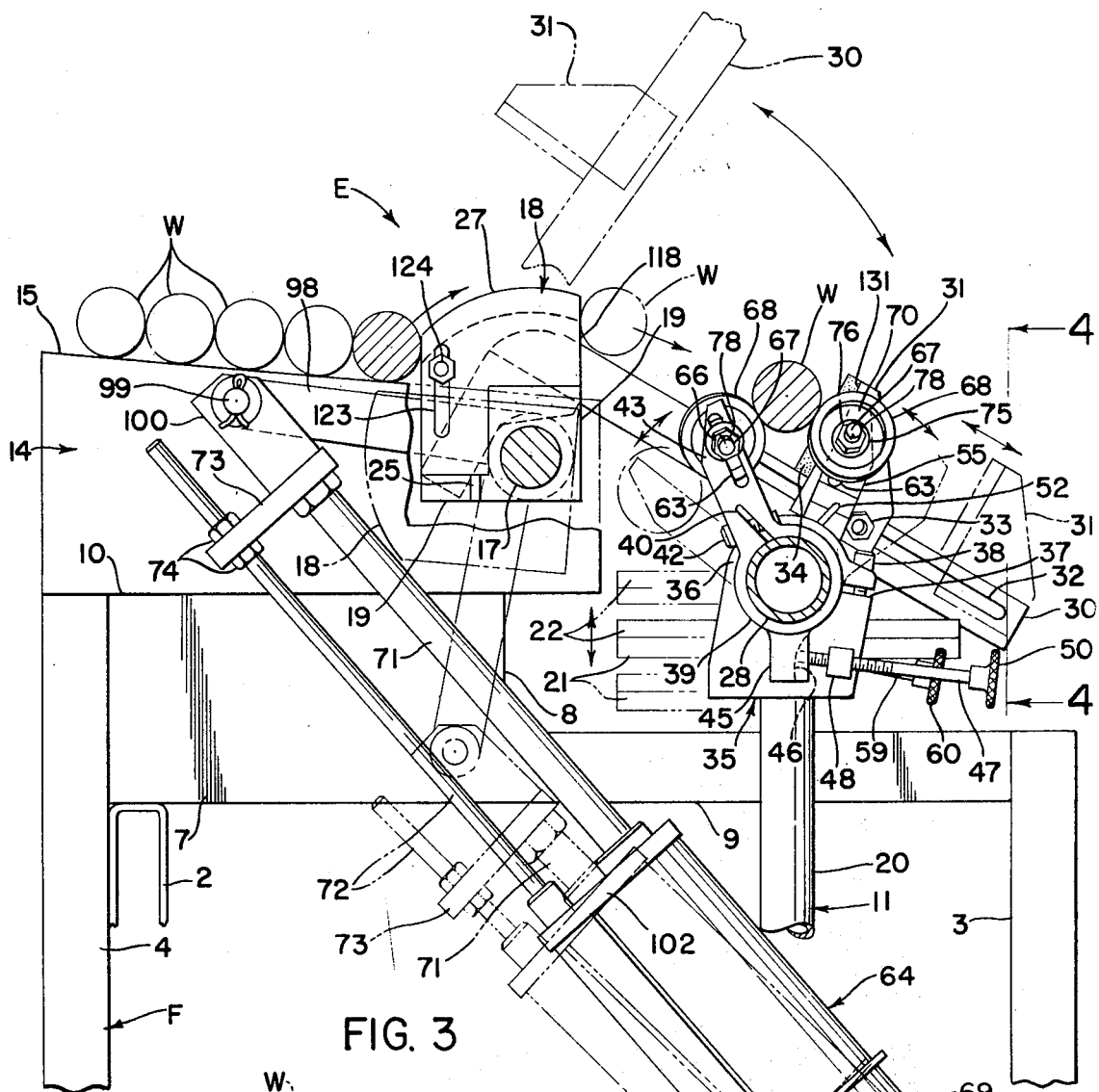
FIG. 3 is a fragmentary transverse vertical sectional view taken on the line 3—3 of FIG. 1 and on a larger scale with parts omitted, the parts associated with the escapement mechanism being shown in solid lines in the advanced positions and in broken lines in the normal retracted positions and other parts being shown in broken lines in adjusted positions.

Referring more particularly to the drawings, which are drawn substantially to scale and in which like parts are identified by the same numerals throughout the several views, FIGS. 1 and 2 show a bar feeder A constructed according to the present invention for automatically feeding cylindrical bars or tubes W from a storage rack to a centerless grinder B. The grinder may be a conventional centerless grinder of the type made by Cincinnati Milling & Grinding Machines, Inc., Landis Machine Tool Company, Van Norman Tool Company, Norton Company, Production Machine Company or Sundstrand-Engleberg Company. As herein shown, the centerless grinder B has conventional grinding and regulating wheels 200 and 300 whose axes may be adjusted laterally toward and away from the bar or tube axis as necessary.

The bar feeder A has a strong rigid steel frame F of welded construction formed by tubular steel beams of generally rectangular cross section including relatively long front and rear horizontal beams 1 and 2, a plurality of vertical legs 3, 4 and 5, and a plurality of lateral horizontal beam members 6 and 7. The two front legs 3 and the longer intermediate leg or standard 5 are welded to the rear beam 2 in alignment with the front legs. A control panel box 16 is rigidly mounted on the standard 5. The three lateral members 6 extend between and are welded to the top of the beam 1 and to the inner sides of the front and rear legs near the bottom of said legs. The three lateral support members 7 are welded to the top of the rear beam 2 and extend between and are welded to the front and rear legs.

The upper front portion of each member 7 is cut away as shown in FIG. 3 to provide a cut vertical surface 8 and a U-shaped channel portion 9 with horizontal upper edges located in the same horizontal plane as the flat upper surfaces of the front legs 3. The flat horizontal upper surface 10 of each member 7 may be located in the same horizontal plane as the flat upper surfaces of the rear legs 4.

Means are provided for supporting a series of bars or tubes W in a row above the surface 10 for feeding laterally one at a time to a conventional bar supporting fixture to be described hereinafter. As herein shown, a suitable feed and storage rack is provided by welding trapezoidal ramp plates 14 to the flat surfaces 10 in vertical positions parallel to the lateral members 6 and 7 and perpendicular to the direction of the longitudinal beams 1 and 2. The upper bar-engaging surfaces 15 of the ramp plates are flat and located in a plane which is inclined somewhat relative to the horizontal so that the bars W roll toward the front legs 1. The optimum inclination depends on the weight of the bars or tubes being handled. As herein shown such inclination is fixed rather than adjustable. However, it will be apparent to those skilled in the art that the construction of the ramp plates may vary considerably. On the discharge side of the machine, the upper surfaces 15a of the ramp plates 14a corresponding to the plates 14 are inclined in a direction to cause the bars to roll away from the tube 28.

It will be apparent that the ramp plates may be loaded by means other than a fork-lift truck or overhead conveyor. Because the bar feeder of this invention has a storage ramp similar to that disclosed in applicant's U. S. application Ser. No. 793,005, now U.S. Pat. No. 3,506,142, it may obviously be fed by a bundle unscrambler of the type disclosed in that patent if it is desired to eliminate manual loading. Similar equipment may also be employed to catch the finished bars or tubes in a bundle as they roll off of the ramp 14a.

Figure 4:
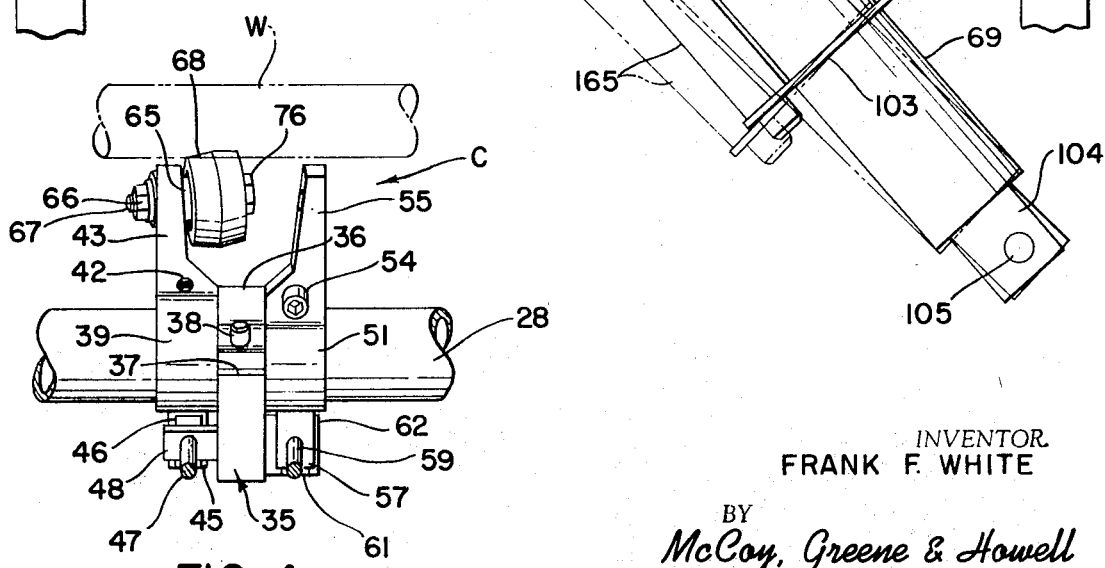
FIG. 4 is a fragmentary elevational view looking in the direction of the arrows 4—4 in FIG. 3, the adjusting knobs and one of the bar-supporting wheels being omitted for clarity.

The bar feeder A disclosed herein employs work supporting means of the type disclosed in U. S. Pat. No. 3,091,900 and has elements 11, 12, 20, 21, 22, 23, 24, 26, 28, 29, 35 through 40, 42, 43, 45 through 48, 50, 51, 52, 53, 55, 57, 59, 60, 62, 63, 65, 66, 67, 68, 70, 75, 76 and 78 which are equivalent to and function like correspondingly numbered elements of said patent. The bar feeder A includes a long cylindrical guide tube 28 adjustably supported in a horizontal position by a plurality of spaced vertical standards 11. A series of cross arm assemblies C of the type shown in FIG. 4 are mounted at spaced locations along the length of the horizontal tube 28 as shown in FIGS. 1 and 2. Each assembly C provides a readily adjustable support for a pair of work-supporting rollers 68 whose axes are inclined a few degrees relative to the workpiece axis to impart forward motion to the workpiece in response to rotation of the workpiece. The rollers 68 may be formed of rubber or steel or may have a rubber sleeve mounted on a steel wheel.

Each of the standards 11 is vertically adjustable as disclosed in said U.S. Pat. No. 3,091,900 and has a fixed tubular vertical support 12 and a cylindrical tube 20 which slides vertically within the tube 12. A guide member 113 may be welded to the support 7 to guide the tube 12 vertically. Suitable means are provided for adjusting the vertical position of each tube 20 such as internally threaded lugs 23 welded to the tube 20 and the support 12 and an adjusting screw 24 extending through the lugs. The tubular support 12 is rigidly mounted on the side of one of the lateral members 6 and may be reinforced by a supporting member 13 which is welded to the member 6. A flat horizontal rectangular support plate 21 is welded to the top of each tube 20 and has an upper face which is ground perfectly flat to engage the similarly ground flat bottom surface of a floating rectangular plate 22. A pair of angle members 26 is welded to each plate 2 on opposite sides of the main guide tube 28 and has a pair of apertures which receive a horizontal pin 29 extending laterally through the guide tube, whereby the latter is connected to the plate 22.

Each cross arm assembly C has a central bracket member 35 extending below and around the tube 28 with a curved upper portion 36 extending over the top of the tube. The bracket member 35 is internally cylindrical and adopted to slide axially on the tube 28. In order to clamp it in position on said tube, it has a transverse slit 37 and a locking screw 38 which extends through portions of the member 35 on each side of the slit as shown in FIG. 3.

An internally cylindrical sleeve portion 39 is slidably mounted on the tube 28 at one side of the member 35 and has suitable means for clamping the sleeve in the desired position on the tube 28 including an inclined slit 40 and a locking bolt or screw 42 which extends through portions of the sleeve on opposite sides of the slit (see FIG. 3). Each assembly C has a first cross arm 43 integrally joined to the sleeve portion 39 and extending upwardly therefrom and a control member 45 welded to said sleeve and extending downwardly as shown in FIGS. 3 and 4. A first adjusting screw 47 extends through an internally threaded lateral boss 48 which is welded to the bracket member 35 and engages the bottom of a narrow groove 46 in the control member 45. The screw has a knurled knob or handle 50 which may be turned to effect angular adjustment of the cross arm 43 while the locking screw 42 is loose. Said screw is then tightened to hold the cross arm in its adjusted position.

On the opposite side of the bracket member 35, there is provided a short internally cylindrical sleeve portion 51 slidably mounted on the guide tube 28 and having an inclined slit 52 and a locking bolt 54 which extends through and screws into portions of the sleeve on opposite sides of the slit to clamp the sleeve in place on the tube 28. A second cross arm 55 is integral with the sleeve portion 51 and extends upwardly therefrom. A second downwardly projecting control member 57 is welded to or otherwise integrally connected to the sleeve portion 51. This control member, unlike the member 45, has a threaded bore therethrough which receives the adjusting screw 59. A lateral boss 62 is welded to the bracket member 35 and has a narrow groove 61, similar to groove 45, which receives the end of the screw 59. The knurled knob 60 of said screw may be turned to adjust the position of the cross arm 55 after the locking screw 54 is loosened. The latter screw is then tightened to hold the arm in its adjusted position.

The work-supporting rollers 68 are mounted on the cross arms 43 and 55 in the same manner and, therefore, a description of one mounting is sufficient. Each of the cross arms has a narrow slot 63 of a size to receive the shaft 67 on which the roller 68 is mounted. The shaft 67 is threaded at its opposite ends to receive nuts 66 and 76, which may be tightened to hold the shaft in its desired adjusted position in the slot 63. As herein shown, each of the rollers 68 has a conventional roller bearing 70 with an inner race held against the inclined face of a small mounting block 65. A flat washer 75 fits on the threaded end portion 78 of the shaft 67 between said inner race and the nut 76.

The inclined face of the block 65 causes the axis of the shaft 67 and the axis of rotation of the rollers 68 to be inclined a few degrees relative to the axis of the horizontal guide tube 28. If desired, the outer surface of each roller 68 may be tapered slightly as shown in FIGS. 4 and 6 to minimize wear and to provide better contact with the bar W, but this is not essential.

The bar feeder A of this invention has suitable escapement means for transferring one bar at a time from the storage ramp at 14 to the bar-supporting rollers 68 of the assemblies C. Such means includes a long horizontal escapement shaft 17 extending through the ramp plates 14 and journaled for rotation thereon. The shaft 17 extends parallel to the guide tube 28 the full length of the frame F and has four or more longitudinally spaced mounting blocks 19 rigidly mounted thereon. A radially adjustable escapement plate 18 is mounted on each block 19 and has a narrow adjusting slot 123. An adjusting screw 124 extends through the slot into the block 19 for clamping the plate 18 in the desired adjusted position. The plate 18 has a flat bar-engaging surface 118 parallel to the slot 123 and a rounded bar-engaging outer surface 27 which may be substantially coaxial with the shaft 17. A key 25 may be provided in a keyway formed between the plate 18 and the block 19 to guide the plate parallel to the slot 123 when it is adjusted.

A load arm 30 is integrally connected to each of the blocks 19 and has a trapezoidal stop member 31 adjustably mounted thereon. Each of the arms 30 has a narrow elongated slot 32, and each of the stop members 31 has a pair of locking screws 33 extending through the slot 32 to hold the stop member in the desired adjusted position. The outermost adjusted position is shown in dot-dash lines in FIG. 3. As herein shown, each arm 30 has a length more than six times its width and the slot 32 has a length more than four times said width and substantially more than half the length of said arm. The flat surface 131 of the stop member 31 is preferably perpendicular to the direction of the slot 32 and is covered by a cushion layer 34 formed of a relatively hard elastic rubber or other elastomeric or cushioning material.

Means are provided for turning the shaft 17 to swing the load arms 30 in unison between a retracted position as shown in dot-dash lines in FIG. 3 and an advanced position as shown in solid lines in that figure. As herein shown, such means includes an air-hydraulic unit 64 having a pneumatic cylinder 69 mounted in parallel with a hydraulic cylinder 165. The cylinders are rigidly connected by plates 102 and 103. The piston rods 71 and 72 of said cylinders 64 and 165, respectively, are rigidly connected together by a connecting plate 73 for reciprocation in unison and are operatively connected to a lever arm 98 having a hub portion 101 rigidly mounted on the shaft 17. The lever arm is pivotally connected by a pivot pin 99 to a connecting member 100, which is rigidly connected to the piston rod 71. The lower end of the cylinder 69 is pivotally connected to the beam 1. As herein shown, a pair of spaced mounting lugs 104 are carried by the cylinder 69 and are pivotally connected by a pivot pin 105 to a mounting block 106, which is welded to the top of the beam 1 and projects between said lugs.

A prerotation drive unit D is provided to rotate the bar W and cause it to advance axially into the centerless grinder B. The unit has a motor-driven drive wheel 92 which is swung vertically into and out of engagement with the bar W by a pneumatic cylinder 94. As shown in FIGS. 5 and 6, the unit D is supported on a flat rectangular base plate 80 having a pair of vertical plates which are rigidly connected to the guide tube 28 to hold the plate 80 in a horizontal position. Rigidly mounted on said plate is a vertical cylindrical tube 82 having a horizontal support block 83 mounted to slide vertically thereon. The block 83 can be moved to various adjusted positions on the tube as shown in dot-dash lines in FIG. 5 and may be held in the desired position by set screws 84 or other conventional holding means. However, such adjustments are not usually required because the block 83 moves vertically when the guide tube 28 is adjusted vertically to accommodate bars of a different diameter.

A pair of vertical plates 85 are welded to the bottom of the block 83, and a supporting arm 86 extends between said plates and is pivotally connected thereto by a horizontal pivot pin 87. A motor support block 89 is rigidly mounted on the end of the piston rod 97 and is pivotally connected to the outer end portion of the arm 86 by a horizontal pivot pin 88 parallel to pin 87 and the shaft 91 of the wheel 92. The air motor 90 which drives the shaft 91 has a housing which is rigidly connected and supported by the block 89. The cylinder 94 is pivotally supported on a horizontal pivot pin 96 parallel to shaft 91 by a pair of vertical supporting ears 95, which are welded to the top of the block 83.

The normal retracted positions of the supporting arm 86 and the wheel 92 are shown in dot-dash lines in FIG. 5. In said retracted positions, they are out of the path of movement of a bar W traveling from the ramps 14 to the units C. After the bar is loaded onto the rollers 68 by the arms 30, the piston of the pneumatic cylinder 94 is advanced to lower the motor-driven wheel 92 against the bar as shown in solid lines in FIG. 5. The outer surface of the wheel is preferably covered by a sleeve or annulus 93 formed of a relatively hard elastic rubber or other elastomeric abrasion-resistant material. If desired, the outer surface of such annulus may be tapered somewhat like the outer surface of the rollers 68, but this is not essential.

As shown in FIG. 6, the axis of rotation of the shaft 91 and the bar-engaging drive wheel 92 is inclined a few degrees relative to the axis of the tube 28 and relative to the axis of the bar W supported on the roller 68. Such inclination may be about 3 to about 4 degrees and provides a smooth axial feed of the work to the grinder B at a controlled speed which is at least equal to and preferably somewhat greater than the axial speed of the work as it moves through the grinder B during the grinding operation. The latter speed is determined by the grinding wheel 200 and the regulating wheel 300 which are adjusted and controlled in the conventional manner to effect the desired grinding operations.

As herein shown, the bars of tubes W are cylindrical throughout their length so that there is no need to retract the supporting rollers during axial feeding of the work. It will be understood, however, that manually or automatically retractable units C may be provided when the bar feeder is employed to feed bars, tubes or other pieces having radial flanges or the like which would otherwise interfere with proper feeding to the grinder. It will also be understood that the feeder may be designed to reverse the direction of feed to remove a flanged piece from the grinder when the grinding operations are completed.

The feeding and grinding equipment illustrated in the drawings is designed to move the work through the grinder B in one direction only from the bar feeder A to the bar unloader A' shown in FIGS. 8 and 9. Such unloader A' may be substantially identical with or a mirror image of the bar feeder A, except for the ramp plates, and may have a pair of supporting standards 11, a series of bar-lifting arms 30, a series of cross arm assemblies C, a retractable drive assembly D and a rigid steel frame F which are constructed the same as the standards 11, the arms 30 and the assemblies C, D and F of the feeder A. As herein shown, the unloader A' has a frame F which is identical to the frame of the bar feeder A and has a series of horizontal tubular supports 7 but which has welded thereto a series of vertical trapezoidal ramp plates 14a with flat upper bar-engaging surfaces 15a that slope away from the guide tube 28 to facilitate removal of the finished bars or tubes W. The escapement shaft 17 extends through the plates 14a and is journaled for rotation about a horizontal axis parallel to the guide tube 28. A series of unload arms 30 are rigidly mounted on the shaft 17 and have stop members 31 adjustably mounted thereon. The escapement plates 18 are omitted on the unloader A' because there is no loading operation. Swinging of the shaft 17 and the arms 30 is effected by the pneumatic cylinders 94' whose piston rod 97' is operatively connected to the shaft 17, like the piston rod 97. However, the angular movement of the unload arms 30 is preferably substantially less than that of the load arms 30 of the feeder A.

The equipment shown herein includes a single horizontal guide tube 28 with a length more than twice the length of the feeder A or the unloader A' having its central portion rigidly supported within the grinder B and having the remainder of the tube supported above the adjustable standards 11 by the floating plates 22, which are free to slide on the flat upper surfaces of the plates 21 in the conventional manner as described in said U.S. Pat. No. 3,091,900. Adequate support for the guide tube 28 is provided by a pair of spaced standards 11 and a pair of floating plates 22 in each of the assemblies A and A'.

The operation of the bar feeder A, the centerless grinder B and the bar unloader A' may be controlled manually or semiautomatically, and it is preferably to provide a number of limit switches or the like so that the parts are operated in the desired sequence. As herein shown, there are provided seven solenoids, SOL 1 through SOL 7, and eight limit switches, 1 LS through 8 LS, in connection with the electrical controls for a pneumatic system which is illustrated schematically in FIG. 10. The diagram in the latter figure is substantially in accordance with the published "JIC Hydraulic Standards for Industrial Equipment." Such standards were adopted at the Joint Industry Conference in Detroit, Michigan, in Apr. 1959, and are well understood in the machine tool industry.

Figure 10:
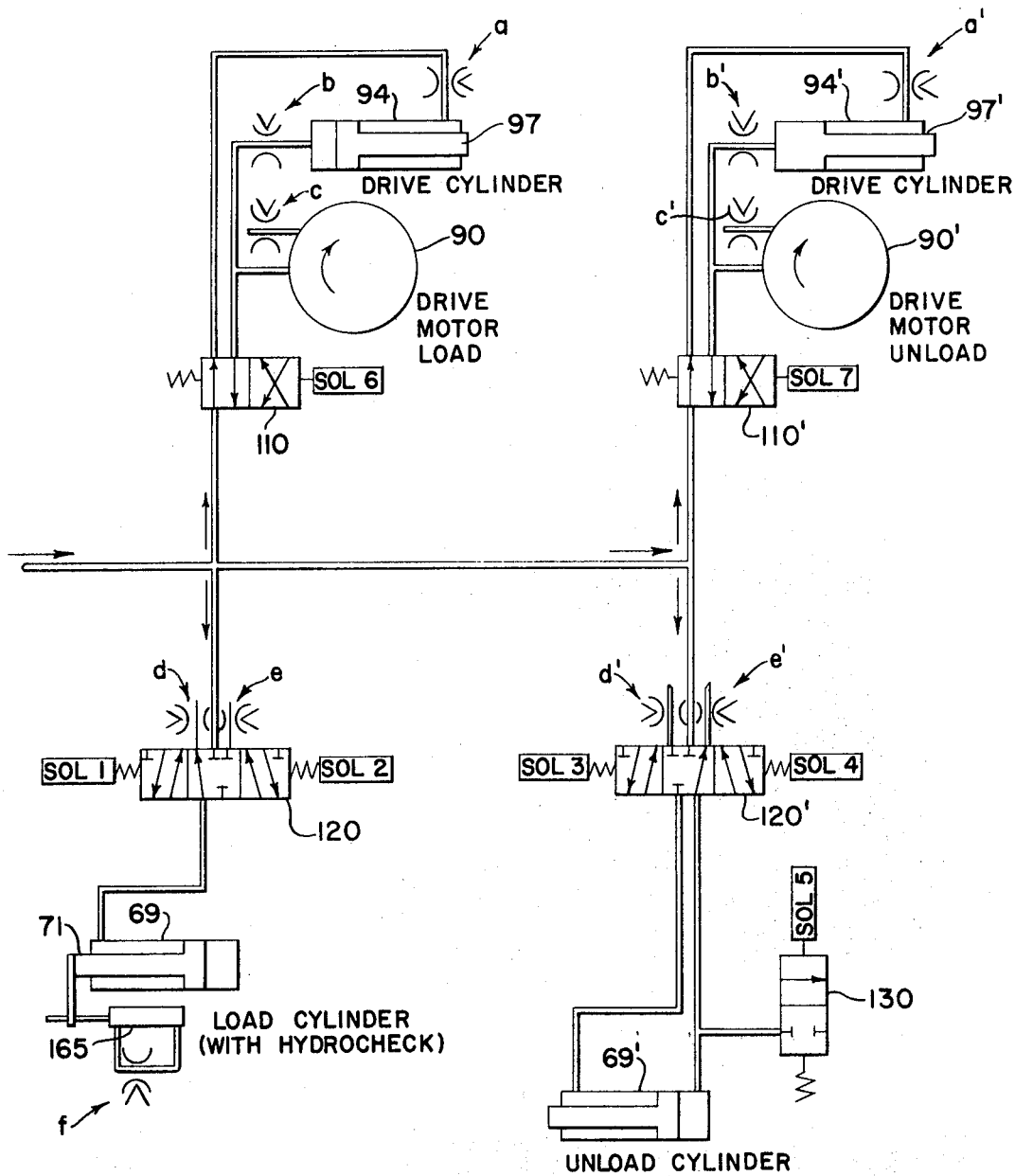
FIG. 10 is a schematic pneumatic diagram showing the fluid controls which may be used with the feeder of this invention.

As shown in FIG. 10, the bar unloader A' has an air motor 90' and pneumatic cylinders 69' and 94' corresponding to the motor 90 and cylinders 69 and 94 of the bar feeder A for rotating and swinging the drive wheel 92 to rotate the bar W and for swinging the unload arms 30. Variable restrictions a through e are provided so that the desired air flow rates may be obtained for the motors 69, 90 and 94 of the feeder A, and similar variable restrictions a' through e' are provided for the unloader A'. The hydraulic cylinder 165 also has a variable restriction f which may be adjusted to provide the desired speed for lowering of the bar onto the rollers 68.

The swinging and rotational movements of the wheel 92 of the assemblies A and A' are controlled by conventional two-position, spring-offset, directional valves 110 and 110' which are actuated by the solenoids SOL 6 and SOL 7. The load and unload cylinders 69 and 69' are controlled by three-position, spring-centered, directional valves 120 and 120', respectively, through solenoids SOL 1 through SOL 4. The cylinder 69' also has a conventional two-position, spring-offset valve 130 controlled by a solenoid 5.

Figure 11:
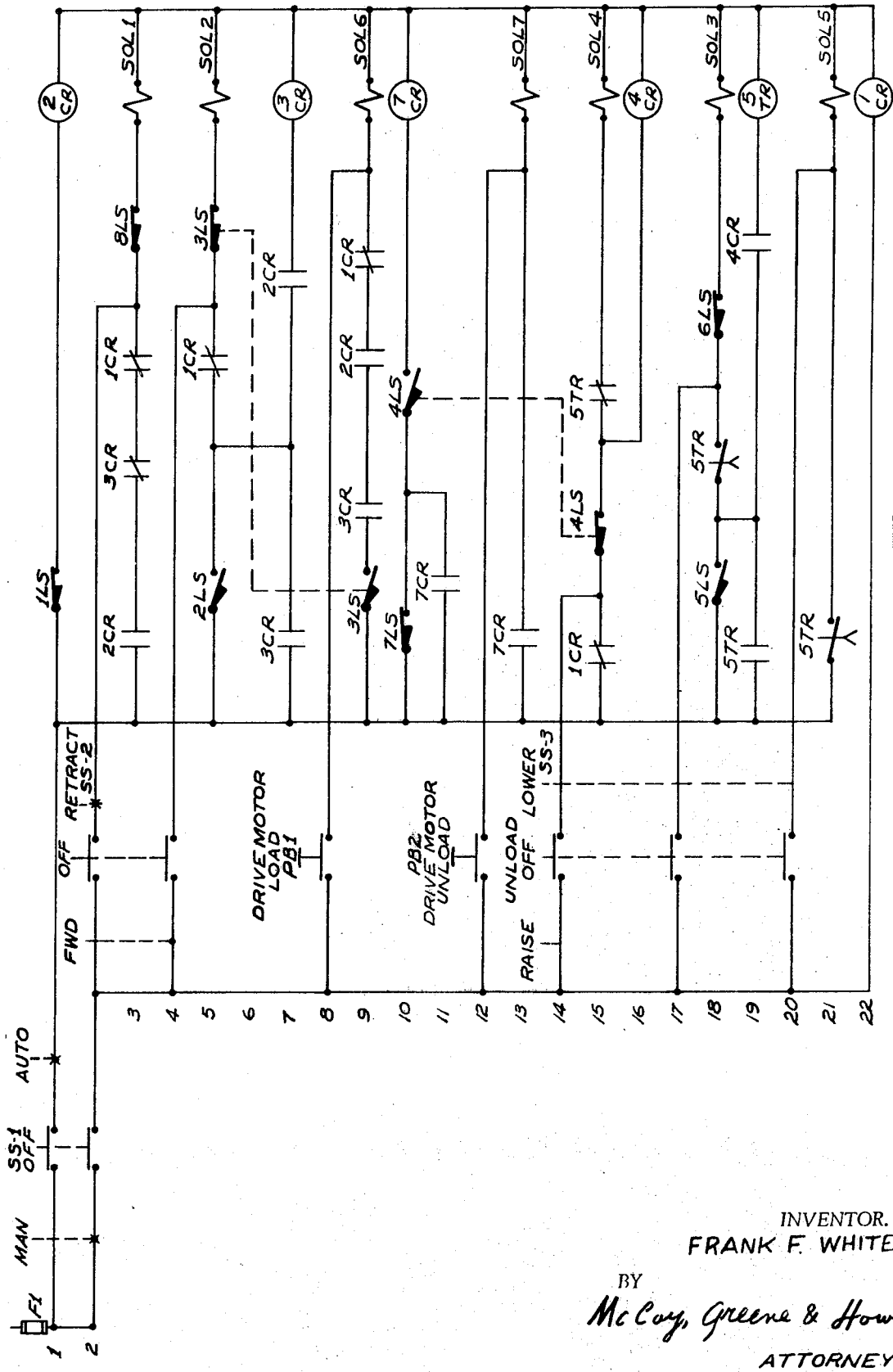
FIG. 11 is a schematic electrical diagram.

FIG. 11 is a schematic electrical diagram illustrating one type of automatic control system which may be employed with the equipment shown in FIGS. 1 to 10. In general the graphic symbols and basic device designations employed in the diagram are in accordance with the electrical standards of the Joint Industrial Council as set forth in the Apr. and May, 1967, issues of "Electro-Technology." Thus the lines of the circuit diagram are numbered at the left of FIG. 11 and are referred to by these numbers in the description which follows.

Manual controls are preferably provided in addition to the automatic controls for set up purposes or short runs. As herein shown, manual operation is effected by moving the three-position selector switch SS-1 to the "MAN." position and controlling the operations by means of the three-position selector switches SS-2 and SS-3 and the push buttons PB-1 and PB-2 which are located on the control panel at 16. During manual operation, the automatic controls are rendered ineffective by the control relay 1 CR of line 22, which opens its normally-closed contacts in lines 3, 5, 9 and 15.

Automatic operation is effected by moving the selector switch SS-1 to the "AUTO" position to close its contacts in line 1. Assuming that there is no bar W present on the rollers 68 of the bar feeder A, the various limit switches 1 LS through 8 LS are in their normal positions as shown in FIG. 11. Therefore, the limit switch 1 LS is closed and closing of the SS-1 contacts in line 1 energizes relay 2CR and closes the normally-open 2CR contacts in lines 3, 7 and 9. Since switch 8LS is closed, solenoid SOL 1 is energized in line 3 to move the cylinder 69 in a direction to retract the load arms 30. The limit switch 2LS in line 5 is closed in response to such retraction of the arms to energize the solenoid 2 in line 5 and the control relay 3CR in line 7, thereby closing the normally-open 3CR contacts in lines 7 and 9 and opening the normally-closed 3CR contacts in line 3 to deenergize solenoid SOL 2. Solenoid SOL 2 moves the valve 120 in a direction to cause forward movement of the load arms 30 and thereby moves one bar W from the feed ramp 14 to the supporting rollers 68. The limit switch 3LS is actuated in response to such forward movement of the arms to open its contacts in line 5 (deenergizing solenoid SOL 2) and to close its contacts in line 9, thereby energizing solenoid SOL 6 and causing the valve 110 to supply air under pressure to the air motor 90 and the cylinder 94. This swings the drive wheel 92 against the bar W and causes rotation and axial feeding of the bar into the grinder B.

As the bar W advances into the grinder, the limit switch 8LS is opened and held open. Thereafter, the bar engages the limit switch 1LS in the grinder to open its contacts in line 1 and to deenergize the control relay 2CR, whereby the 2CR contacts in line 3, 7 and 9 return to their normal open positions and solenoid 6 is deenergized. This reverses the valve 110 and causes immediate retraction of the drive roller 92. The limit switch 1LS may be located near the regulating wheel 300 so that the bar engages said wheel immediately after the retraction of the drive wheel 92 and continues to move axially through the grinder.

During the grinding operations the bar W advances axially toward the assembly A' and engages first the limit switch 7LS and then the limit switch 4LS. While the bar remains in engagement with these switches, the limit switch 7LS is held open in line 10 to prevent energizing of the control relay 7CR and the switch 4LS is held open in line 15 to prevent energizing of the solenoid SOL 4. As soon as the bar moves past the switch 7LS, it returns to its normal closed position to energize relay 7CR in line 10 and to close the normally-open 7CR contacts in lines 11 and 13, thereby energizing solenoid SOL 7 and moving valve 110' to a position wherein the air motor 90' is actuated and the cylinder 94' lowers the drive roller 92 of the assembly A' into contact with the bar W.

The bar is advanced axially by the wheel 92, and, when the end of the bar passes the limit switch 4LS, the switch returns to its normal position to energize the solenoid SOL 4 in line 15 and the control relay 4CR, thereby closing the 4CR contacts in line 19. The opening of the 4LS contacts in line 10 deenergizes relay 7CR and solenoid SOL 7, whereby the valve 110' is reversed to cause retraction of the drive wheel 92 by the cylinder 94'. The solenoid SOL 4 moves the valve 120' in a direction to cause the cylinder 69' to extend and raise the arms 30 of the unloader A', whereby the finished bar W is lifted off the rollers 68 and transferred to the unload ramp 14a.

The limit switch 5LS is closed in line 18 in response to raising of the unload arms 30 to energize the timer relay 5TR and open the normally-closed 5TR contacts in line 15, thereby deenergizing the solenoid SOL 4 and allowing the valve 120' to return to its central position, blocking flow to the cylinder 69' and holding it in its extended position. After a suitable time delay (e.g., 1 to 3 seconds) sufficient to permit movement of the bar W to the ramp 14a, the 5TR contacts close in lines 18 and 21 to energize solenoids SOL 3 and SOL 5. This moves the valve 130 to a position to release the pressure in the cylinder 69' and moves the valve 120' to a position which causes retraction of the piston and lowering of the unload arms 30. The limit switch 6LS is opened in line 18 in response to such lowering of the arms to deenergize the solenoid SOL 3 and allow the valve 120' to return to its central position. This blocks the flow from the cylinder 69' and holds the unload arms 30 in a lowered position under and out of the path of movement of the next bar.

During the operation of the unloader A' the bar feeder A continues to operate. The limit switch 8LS closes to initiate another cycle as soon as the trailing end of one bar W passes that switch. Thus the feeder A can maintain a steady flow of bars or tubes W to the grinder B.

The bars may be relatively long or relatively short. The bar feeder A shown in the drawings is designed to handle bars with lengths up to about 12 feet, but it will be apparent that a similar arrangement could be provided to handle longer bars with lengths of 25 feet or more. Also the equipment could be made heavier to handle heavier bars or bars of greater diameter. It will be noted, however, that thin-walled tubes have less weight than solid bars and that the bar feeder A shown herein can be adjusted to handle tubes or relatively large diameter. Equipment of this type is versatile and can be designed so that one feeder can handle tubes with a diameter of more than 10 inches and also bars with a diameter of less than one-half inch.

The wide range of adjustments will be apparent from inspection of FIG. 3. The slots 32 and 123 are relatively long to permit adjustment for bars W of very large or very small diameter. Likewise, each cross-arm unit C can be adjusted over a wide range and the height of the guide tube 28 can be adjusted to accommodate bars and tubes of widely varying diameters.

It will be noted that the stroke of the cylinder 69 is such as to move the shaft 17 from a retracted position, wherein the flat surface 118 of each escapement plate 18 is adjacent to, substantially parallel to, and below the ramp surface 15, and an advanced position as shown in solid lines in FIG. 3, wherein the load arm 30 is downwardly inclined and its top surface is a short distance (e.g., one-fourth inch to three-fourths inch) below the bar W supported by the rollers 68. The arrangement of the air-hydraulic unit and the speed controls associated therewith are critical features of the invention because the arms cannot function in the intended manner unless the bar is lifted and thrown outwardly in a predetermined manner and the load arms 30 are lowered at the proper speed.

The bar loading arrangement of the present invention is unique because of the unusual handling of the bars or tubes W. Care must be taken to avoid heavy impact of the bar on the rollers 68, and yet the bar feeder A literally throws the bar toward the rollers when the arms 30 are raised. Instead of raising the arms slowly, the air-hydraulic unit 64 extends rapidly and lifts the arms at a speed sufficient to cause the bar W to engage the stop 31 before the arm is lowered below the bar-engaging surfaces of the rollers 68. Then the speed of movement of the piston rod 71 is drastically reduced to provide a slow gentle lowering of the bar W onto the rollers 68. The unusual combination of rapid and slow movements effects rapid loading of the bar while at the same time avoiding damage to the bars.

The cylinder 69 must be designed to provide the necessary high speed movement of the arms and is preferably provided with variable restrictions, such as the restrictions d and e shown in FIG. 10, to take car of variables, such as changes in the weight and diameter of the bars or tubes W.

The hydraulic cylinder 165 must be of the proper size to permit the necessary high speed operation of the cylinder 69 and to slow down piston movement to the desired rate at the proper time. The hydraulic cylinder 165 may be of conventional construction and may have the usual hydraulic reservoir, one-way check valve and flow control with an infinitely variable speed rate. A cylinder of this type, known as "Allenair Cyl-Check," is made by Allenair Corporation of Mineola, New York. The check valve renders the cylinder 165 ineffective during retraction of the piston. The hydraulic cylinder is arranged to be ineffective during the first half of the stroke of the pneumatic cylinder 69 and to resist further advancing movement of the piston only after it has traveled at least half of its full stroke. The threaded piston rod 72 of the cylinder 165 and the adjusting nuts 74 thereon permit adjustment of the piston rod 72 over a wide range so that the operation of the cylinder 165 can be properly correlated with that of the cylinder 69.

It will be noted that, when the load arms 30 are in the normal retracted position, the innermost bar W engages the top surfaces of the arms. The escapement plates 18 must be adjusted so that, when the arms are in said retracted position, the distance from the axis of the shaft 17 to the arcuate surface 27 is substantially greater than the distance from said shaft axis to the axis of said innermost bar W and such that the flat surface 118 of the plate 18 does not engage the next adjacent bar W so that the plates 18 can lift one bar W from the ramp 14 without lifting the next adjacent bar.

The stop 31 is adjusted so that it is spaced a small fraction of an inch (e.g., 0 to one-fourth inch) from the bar W supported by the rollers when the load arm is in an advanced position adjacent to but out of contact with the bar (as shown, for example, in FIG. 3). The positions of the stops 31 on the unload arms 30 of the bar unloader A; is not as critical, but they may also be positioned in the manner described above.

The pre-rotation drive unit D is shown herein with the drive wheel 92 engaging the top of the bar W. This is satisfactory when driving bars or tubes of light weight as the force of the wheel 92 increases the friction against the supporting rollers 68. When the bars W are heavy the drive unit D may be reversed to engage the bottom of the bar and reduce excess weight on the rollers 68. It will be apparent that more than one drive unit D may be employed for this purpose.

The air-hydraulic unit 64 is constructed to move the load arms 30 in a predetermined controlled manner. As shown in FIG. 3, the arms swing downwardly from a predetermined retracted position as shown in dot-dash lines to a predetermined advanced position below and out of contact with the bar W (on the rollers 68). The total movement between these positions should be about 70 to 110 degrees and is usually about 80 to 90 degrees. In the retracted position, the arms 30 are inclined preferably about 50 to 90 degrees and usually about 60 to 80 degrees relative to the horizontal.

The time required to move the arms 30 downwardly from the retracted to the advanced position depends somewhat on the length of the arms and the weight of the bars or tubes W but is preferably about 2 to 4 seconds and usually no more than about 3 seconds. During this lowering of the arms, the hydraulic check means 165 restricts the speed of lowering of the arms at least for 1 second until the weight of the bar W is transferred to the rollers 68. Actually the hydraulic means 165 is effective to maintain a controlled slow speed lowering for at least half the time required to move the arms 30 downwardly from the retracted to the advanced position. It usually should remain ineffective and allow rapid lowering of the arms 30 at least until the arms are within 10 degrees of the horizontal. Usually it is arranged to become effective after the arms pass the horizontal position and are inclined downwardly.

The hydraulic means 165 effects a substantial reduction in the speed of movement of the arms and, when it becomes effective, it reduces such speed to less than one-third and sometimes 10 percent to 20 percent of the average speed of the arms during the first part of their downward movement.

During the total angular movement of the load arms from the retracted to the advanced position by the cylinder 69 the hydraulic means 165 is ineffective during one-third to two-thirds and usually 40 to 60 percent of such total movement and is effective at least 20 percent and preferably about 30 to 50 percent of such total movement.

It will be understood that, in accordance with the provisions of the patent statutes, variations and modifications of the specific devices disclosed herein may be made without departing from the spirit of the invention.

Having described may invention, I claim:

1. A bar feeder having a rigid frame (F) including an inclined feed ramp (14) for supporting bars (W), bar-supporting carrier means (C) for receiving each of the bars (W) discharged from said feed ramp and for supporting such bar in a predetermined substantially horizontal position, and escapement means (E) for moving the bars one at a time from said feed ramp to said horizontal position including an escapement shaft (17), at least one escapement plate (18) rigidly mounted on said shaft, at least one narrow bar-engaging load arm (30) mounted on said shaft and having a length of about 1 foot to 3 feet, a bar-engaging stop member (31) adjustably mounted on said arm, said escapement plate (18) having a bar-engaging surface (118) extending generally outwardly away from said shaft, a pneumatic cylinder (69) having a piston rod (71) and a lever (98) for turning said shaft through an angle of at least 70 degrees between an upwardly inclined retracted position adjacent to and in the path of the lowermost bar on said ramp and a downwardly inclined advanced position out of the path of movement of said last-named bar, said cylinder swinging the load arm downwardly to advance a bar from said ramp toward said carrier means, and hydraulic means (165) for reducing the speed of movement of said piston rod during the last half of its stroke, said stop member (31) having an adjusted position on said arm outwardly of said predetermined horizontal position to engage the bar before it is lowered onto said carrier means.

2. The combination defined in claim 1 wherein said hydraulic means (165) reduces the speed of movement of said piston rod during the last half of said stroke to less than one-third the average speed of movement during the first half of the stroke.

3. The combination defined in claim 1 wherein said pneumatic cylinder (69) swings the arms (30) downwardly from a predetermined retracted position inclined upwardly about 50 to 90 degrees to a predetermined advanced position inclined downwardly about 20 to 40 degrees in a period of about 2 to about 3 seconds and said hydraulic means (165) is effective after the arms (30) reach a horizontal position.

4. The combination defined in claim 3 wherein said hydraulic means (165) permits rapid downward movement of the arms (30) at least until they pass the horizontal.

5. The combination defined in claim 1 wherein said hydraulic means (165) permit the arms (30) to move downwardly 30 to 60 degrees from their retracted positions at a relatively high speed and cause them to move at least 30 degrees at a relatively slow speed until the weight of a bar (W) is transferred to the rollers (68).

6. The combination defined in claim 1 wherein said hydraulic means (165) permits rapid downward movement of the arms (30) throughout the first third of said period and causes movement of the arms at a controlled slow speed throughout the last third of said period.

7. The combination defined in claim 1 wherein said hydraulic means (165) is relatively ineffective at least until said arms (30) are within 10 degrees of the horizontal.

8. A bar feeder as defined in claim 1 wherein means including said cylinder (69) are provided for throwing the lowermost bar on said feed ramp outwardly at a high speed and for causing it to move above the carrier means and to roll against said stop member (31) before the arms (30) are lowered below said horizontal position.

9. A bar feeder as defined in claim 1 wherein means (D) are provided for feeding the bar from said predetermined horizontal position.

10. A bar feeder as defined in claim 1 wherein means including said pneumatic cylinder (69) and said escapement plate (18) throw the lowermost bar on said feed ramp outwardly at a high speed during lowering of said arm (30) and cause such bar to move above said carrier means (C) and to roll against said stop member (31) before said arm is lowered below said horizontal position.

11. A bar feeder as defined in claim 10 wherein said carrier means (C) comprises a series of longitudinally spaced bar-supporting carriers (68) for supporting one of said bars in a horizontal feeding position substantially parallel to the bars on the feed ramp and wherein means (D) are provided for feeding the bar from said last-named horizontal position.

12. A process of feeding bars or tubes in a bar feeder (A) having an inclined feed ramp (14) for supporting bars (W) in a generally horizontal position, bar-supporting carrier means (C) for receiving each of the bars discharged from said feed ramp and for supporting it in a predetermined substantially horizontal position, and escapement means (E) for moving the bars one at a time from said feed ramp to said horizontal position including escapement members (18) and a plurality of bar-engaging arms mounted to swing about a generally horizontal axis from an upwardly inclined retracted position to a downwardly inclined position, said process comprising providing relatively long arms (30) and positioning stop means (31) on said arms at predetermined positions outwardly of said predetermined horizontal position to permit movement of a bar (W) on the arms from the feed ramp (14) to a position above said horizontal position, causing each bar (W) escaped from the feed ramp (14) to be thrown outwardly at a high speed and to move above the carrier means (C) while controlling the movement of the arms (30) so that the bar is thrown against the stop means (31) before the arms are lowered below said predetermined horizontal position, and causing each bar to be lowered from said arms (30) to said horizontal position on carrier means (C) shortly after the bar engages said stop means (31).

13. A process as defined in claim 12 wherein said escapement members (18) and said arms (30) are mounted to swing about a horizontal axis (17) and have retracted positions wherein the arms (30) extend upwardly to limit movement of the lowermost bar (W) on the ramp while the escapement member (18) is below said last-named bar, said process comprising swinging the escapement members (18) rapidly about said axis to cause them to engage said last-named bar and throw it outwardly at a high speed to cause it to move above the carrier means while the arms (30) are swung outwardly, and causing rapid deceleration of said arms to cause the bar (W) to engage the stop means (31) just before the arms are lowered below said predetermined horizontal position of the bar.

14. In a bar feeder (A) having a rigid frame (F), a feed ramp (14) for supporting a row of parallel bars (W), bar-supporting carrier means (C) for supporting one of said bars in a predetermined substantially horizontal position substantially parallel to the bars in said row, and escapement means (E) for feeding the bars one at a time from said feed ramp to said predetermined horizontal position including an escapement shaft (17), an escapement plate (18) mounted on said shaft and having a bar-engaging surface (118) extending outwardly in a direction generally away from said shaft, a pneumatic cylinder (69) having a piston rod (71), and a lever (98) for turning said shaft through an angle of at least 70 degrees, the improvement which comprises a narrow bar-engaging load arm (30) with a length of about 1 foot to 3 feet, which length is at least 8 times the width of the arm, a bar-engaging stop member (31) adjustably mounted on said arm in a position outwardly of said horizontal position when the arm is lowered, and hydraulic means (165) for rapidly decelerating the speed of movement of said piston rod during the last half of its stroke as said arm is being lowered.

15. A bar feeder having a rigid frame (F), a feed ramp (14) for supporting a row of long bars (W), bar-supporting means for supporting one of said bars in a predetermined substantially horizontal position substantially parallel to the bars in said row, an escapement shaft (17) rotatably mounted on said frame near the discharge end of said ramp and substantially parallel to said predetermined horizontal position of the bar, a plurality of narrow bar-supporting load arms (30) with a length of about 1 foot to 3 feet mounted on said escapement shaft, a bar-engaging stop (31) mounted on each load arm in a position outwardly of said predetermined horizontal position of the bar when the arm is lowered, and a plurality of bar-engaging escapement members (18) rigidly mounted on said shaft and having faces (118) projecting upwardly for engagement with the lowermost bar in said row, motor means (69) for swinging said shaft and said arms at least 70 degrees from a predetermined retracted position, wherein the lowermost bar on the ramp engages the upwardly inclined load arms and said bar-engaging faces (118) are located below said bar and below the axis of said bar, to an advanced position, wherein the load arms (30) are downwardly inclined and said stop (31) is near said predetermined horizontal position of the bar, and means (165) for rapidly decelerating the shaft (17) when the arms are near the horizontal position.

16. A bar feeder as defined in claim 15 wherein said stops are adjustably mounted on said arms and the innermost and outermost adjusted positions of the stops (31) are spaced apart at least 6 inches.

17. A bar feeder as defined in claim 15 wherein said last-named means comprises a hydraulic cylinder having a variable restriction (f) to limit the speed of the piston when it approaches the end of its stroke.

18. A bar feeder as defined in claim 15 wherein said bar-supporting means comprises a plurality of longitudinally spaced bar-supporting rollers (68) and wherein means (D) are provided for feeding the bar axially on said carriers.

* * * * *